(12) United States Patent
Ma et al.

(10) Patent No.: US 8,437,580 B2
(45) Date of Patent: *May 7, 2013

(54) ARTIFACTS MEASUREMENT ON VIDEO DECOMPOSABLE PROPERTIES BY DYNAMIC FUZZY REASONING

(75) Inventors: Yue Ma, San Jose, CA (US); Hongmin Zhang, Santa Clara, CA (US)

(73) Assignee: Pixelworks, Inc., Portland, OR (US)

(*) Notice: Subject to any disclaimer, the term of this patent is extended or adjusted under 35 U.S.C. 154(b) by 9 days.

This patent is subject to a terminal disclaimer.

(21) Appl. No.: 12/943,819

(22) Filed: Nov. 10, 2010

(65) Prior Publication Data

US 2011/0052058 A1 Mar. 3, 2011

Related U.S. Application Data

(63) Continuation of application No. 11/531,779, filed on Sep. 14, 2006, now Pat. No. 7,865,041, and a continuation-in-part of application No. 11/531,770, filed on Sep. 14, 2006, now Pat. No. 7,502,529, and a continuation-in-part of application No. 11/216,436, filed on Aug. 30, 2005, now Pat. No. 7,292,738, which is a continuation of application No. 09/925,195, filed on Aug. 9, 2001, now Pat. No. 6,965,705.

(60) Provisional application No. 60/730,243, filed on Oct. 25, 2005, provisional application No. 60/725,897, filed on Oct. 11, 2005.

(51) Int. Cl.
*G06K 9/32* (2006.01)

(52) U.S. Cl.
USPC .............................. 382/300; 382/299

(58) Field of Classification Search ............... 382/299, 382/300
See application file for complete search history.

(56) References Cited

U.S. PATENT DOCUMENTS

| | | | |
|---|---|---|---|
| 5,296,690 A | 3/1994 | Chandler et al. | |
| 5,309,526 A * | 5/1994 | Pappas et al. | 382/237 |
| 5,424,780 A | 6/1995 | Cooper | |
| 5,513,281 A | 4/1996 | Yamashita et al. | |
| 5,602,654 A | 2/1997 | Patti et al. | |
| 5,832,143 A | 11/1998 | Suga et al. | |
| 6,256,068 B1 * | 7/2001 | Takada et al. | 348/441 |
| 6,262,773 B1 | 7/2001 | Westerman | |
| 6,429,872 B1 * | 8/2002 | Ernst | 345/584 |
| 6,529,637 B1 | 3/2003 | Cooper | |
| 7,035,481 B2 * | 4/2006 | Kim et al. | 382/300 |
| 7,280,709 B2 | 10/2007 | Mianami et al. | |
| 7,865,041 B1 * | 1/2011 | Ma et al. | 382/300 |

* cited by examiner

*Primary Examiner* — Wesley Tucker
(74) *Attorney, Agent, or Firm* — Marger Johnson & McCollom PC

(57) ABSTRACT

To determine if a pixel exhibits artifacts, statistics are generated for the pixel and its neighbors. These statistics are compared with thresholds. If the comparison of the statistics and the thresholds suggests that the pixel exhibits a pixel artifact, then recourse can be taken, either to adjust the pixel value in some way, or to reject the angle of interpolation used in computing the value for the target pixel.

36 Claims, 15 Drawing Sheets

US 8,437,580 B2

ARTIFACTS MEASUREMENT ON VIDEO DECOMPOSABLE PROPERTIES BY DYNAMIC FUZZY REASONING

RELATED APPLICATION DATA

This application is a continuation of U.S. patent application Ser. No. 11/531,779, filed Sep. 14, 2006, now U.S. Pat. No. 7,865,041, issued Jan. 4, 2011, which claims priority from U.S. Provisional Patent Application Ser. No. 60/730,243, filed Oct. 25, 2005, by the same inventors and commonly assigned, which is hereby incorporated by reference, and which is a continuation-in-part of U.S. patent application Ser. No. 11/531,770, titled "LOW LEVEL VIDEO DETAIL TRACKING BY INTUITIONISTIC FUZZY RELATIONSHIP CALCULUS", filed Sep. 14, 2006, now U.S. Pat. No. 7,502,529, issued Mar. 10, 2009, which claims priority from U.S. Provisional Patent Application Ser. No. 60/725,897, filed Oct. 11, 2005, and which is also a continuation-in-part of U.S. patent application Ser. No. 11/216,436, titled "METHOD AND SYSTEM FOR DYNAMIC ANGLE INTERPOLATION IN IMAGE PROCESSING", filed Aug. 30, 2005 now U.S. Pat. No. 7,292,738, which is a continuation of U.S. patent application Ser. No. 09/925,195, titled "METHOD AND SYSTEM FOR DYNAMIC ANGLE INTERPOLATION IN IMAGE PROCESSING", filed Aug. 9, 2001, now U.S. Pat. No. 6,965,705, issued Nov. 15, 2005, all by the same inventors and commonly assigned, all of which are hereby incorporated by reference.

FIELD

This invention pertains to displaying data, and more particularly to improving the quality of the display of data.

BACKGROUND

In displaying images on a display (be it a monitor, television, or some other machine that displays data), that data can be received in different ways. When the data is received non-interlaced, the data is sent pixel by pixel, row by row: every row is sent sequentially for every frame. For example, FIG. 1A shows rows 105, 110, 115, 120, 125, and 130 of an image: in FIG. 1A, the image includes a line. If the data are received non-interlaced, then the data in row 105 is 1A, the image includes a line. If the data are received non-interlaced, then the data in row 105 is received, followed by row 110, then row 115, and so on. When the entire image has been painted, the data re received again, starting with the first pixel in row 105. In particular, when the data is received as non-interlaced data, pixel 135 is received as part of the data for row 120 for the image every time the display is refreshed.

Sometimes, however, the data are received interlaced. When the data are received interlaced, the rows are received alternately. So row 105 is received first, then row 115, then row 125, and so on. After the first set of rows is received, the second set is received, starting with row 110, then row 120, then row 130, and so on. Once the second set of rows has been completely received, the process starts over with the first set of rows again. For example, FIG. 1B shows the half of the data that are received when the data are transmitted interlaced.

A problem with receiving interlaced data is that the data in the different sets of rows come from different frames. In other words, the data received in the second set of rows often are from a slightly different image than the data received in the first set of rows. If the image is static, this is not a real problem. But if the image is dynamic (that is, the frames are different, such as might be used to show motion), then the images might not appear smooth (given that different rows are updated at different times).

To address this problem, the display can attempt to fill the missing rows not provided in the interpolated data. That is, given rows 105 and 115, the display can attempt to determine values for the pixels in row 110, such as pixel 135. In this manner, the display can try to display frames that appear smooth.

Even when the data are interpolated to complete each individual frame, using any desired technique, there can be problems. For example, the data that are interpolated might not be correct: the interpolated pixel values might be significantly lighter or darker, or of a different color, than the correct pixel value would be. Such an error is called an artifact.

If the data represent a static image, this is not a significant issue: the human eye is capable of overlooking minor imperfections or errors in data. But where the data represent a moving image, the human eye focuses on such errors because they rapidly appear and disappear. Remember that in interlaced data, alternate rows are received in alternate frames. This means that if, say, pixel 135 is in error as interpolated in FIG. 1B, when the next frame appears, pixel 135 is correctly displayed. Then, in the third frame, pixel 135 is likely to be incorrectly interpolated again, and so on. This repeated correction and error regeneration of pixel 135 would flash like a strobe in the human eye, and the eye would be drawn to this error.

A need remains for a way to detect and address artifacts for a pixel in interlaced data on a display, that addresses these and other problems associated with the prior art.

DETAILED DESCRIPTION

Figure 1A:
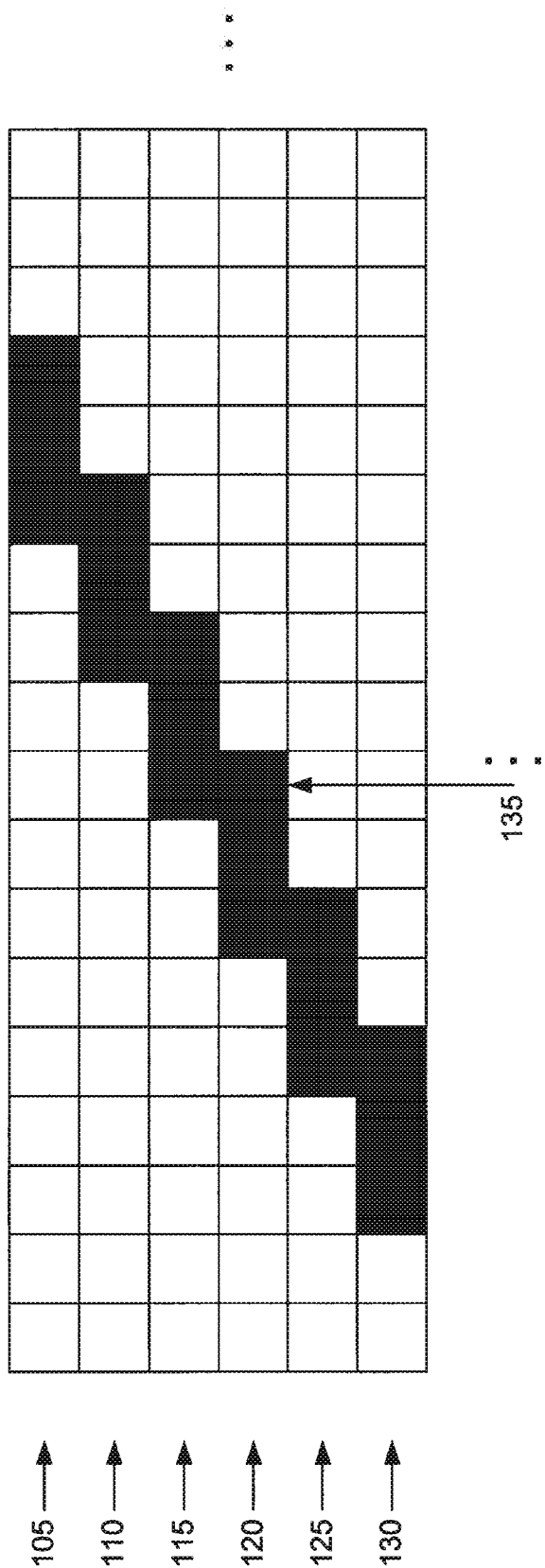
FIGS. 1A-1B show rows of an image, received by a display as either non-interlaced or interlaced data.
Figure 1B:
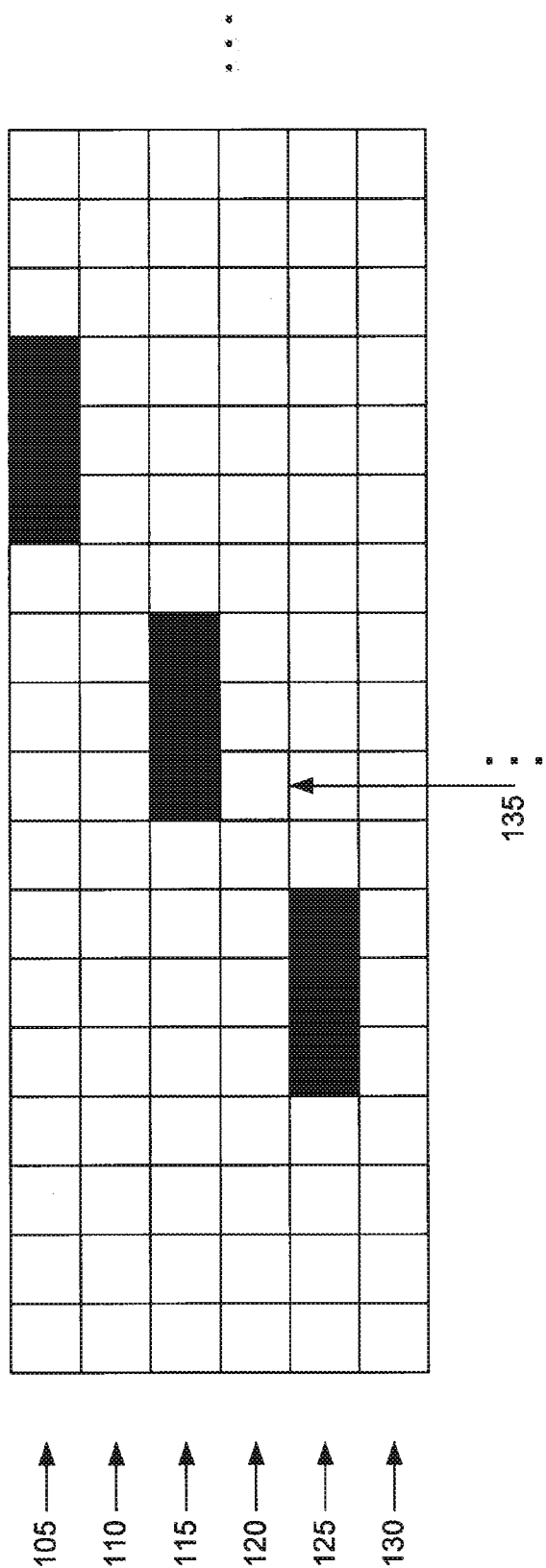
Figure 2:
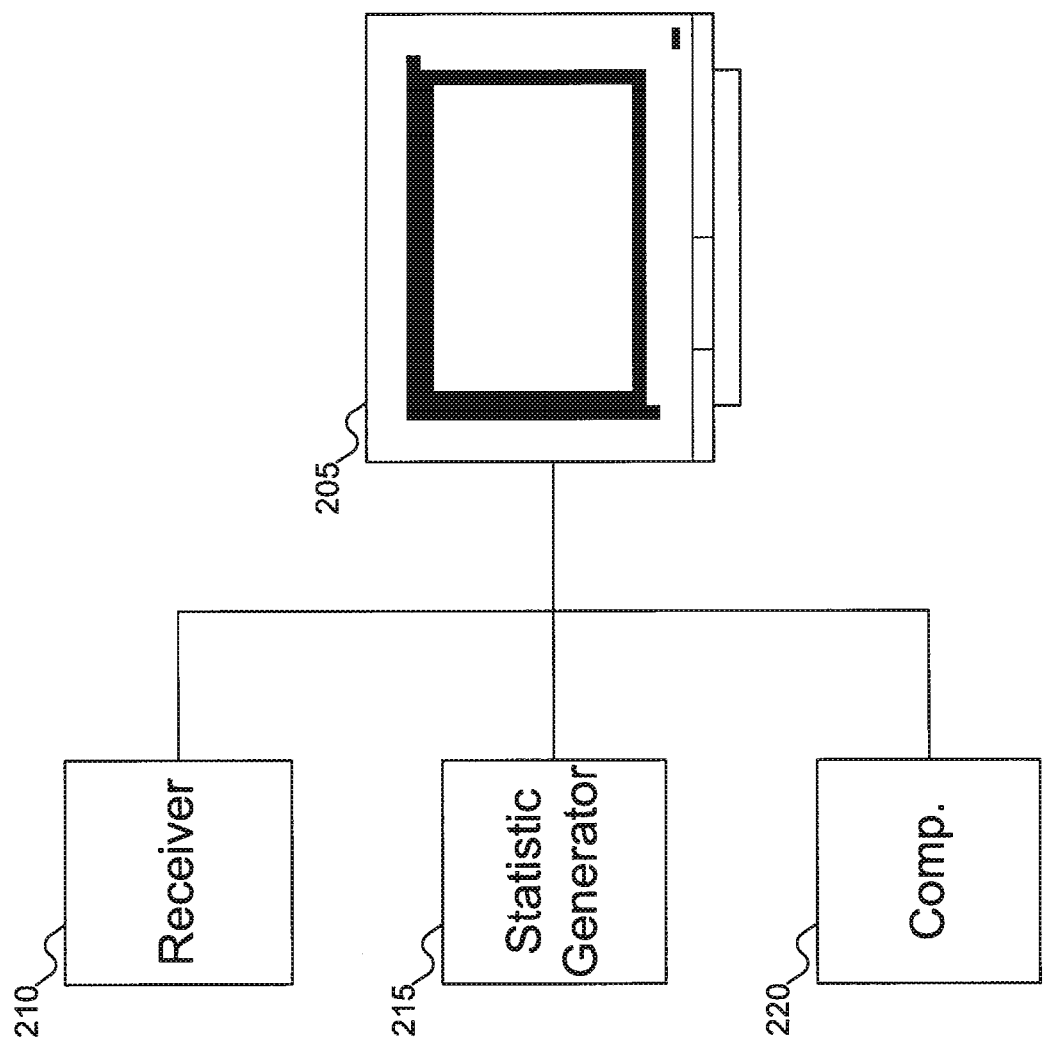
FIG. 2 shows a display operative to detect artifacts in interpolated data, according to an embodiment of the invention.

FIG. 2 shows a display operative to detect artifacts in interpolated data, according to an embodiment of the invention.

In FIG. 2, display 205 is shown as a cathode ray tube (CRT) monitor, as might be connected to a computer. But a person skilled in the art will recognize that the embodiments of the invention are applicable to any display technology, including but not limited to LCD displays, plasma displays, and any other display technology. Further, a person skilled in the art will recognize that embodiments of the invention can be used with displays connected to computers, televisions, or any other form of displays.

Display 205 includes several units. Receiver 210 is used to receive values for pixels to be displayed. These values can be received either from within display 205 or from without. For example, if display 205 is attached to a computer, the pixel data can come from the computer. But if the data is interlaced data, some of the pixel values for any individual frame are generated by display 205; these values would be received from the component responsible for generating the values. (A person skilled in the art might even consider all pixel values to be received from components within display 205, if the values for the pixels received from external sources are "passed around" within display 205 before arriving at receiver 210.) Statistic generator 215 is used to generate statistics for a target pixel using the pixel values received by receiver 210. And comparator 220 is used to compare the statistics generated by statistic generator 215 to determine whether the target pixel exhibits an artifact. Statistic generator 215 and comparator 220 are discussed in greater detail with reference to FIGS. 4-5 below.

While the display of FIG. 2 is designed to interoperate with the pixel interpolation units described in co-pending U.S. patent application Ser. No. 11/531,770, titled "LOW LEVEL VIDEO DETAIL TRACKING BY INTUITIONISTIC FUZZY RELATIONSHIP CALCULUS", filed Sep. 14, 2006, now U.S. Pat. No. 7,502,529, issued Mar. 10, 2009, which is incorporated by reference herein, a person skilled in the art will recognize that embodiments of the invention can interoperate with any pixel interpolation technique. A person skilled in the art will recognize that there are many different ways in which pixel interpolation can be performed. Embodiments of this invention can be used to check pixels for artifacts based on their interpolation using any other desired interpolation technique.

Figure 3:
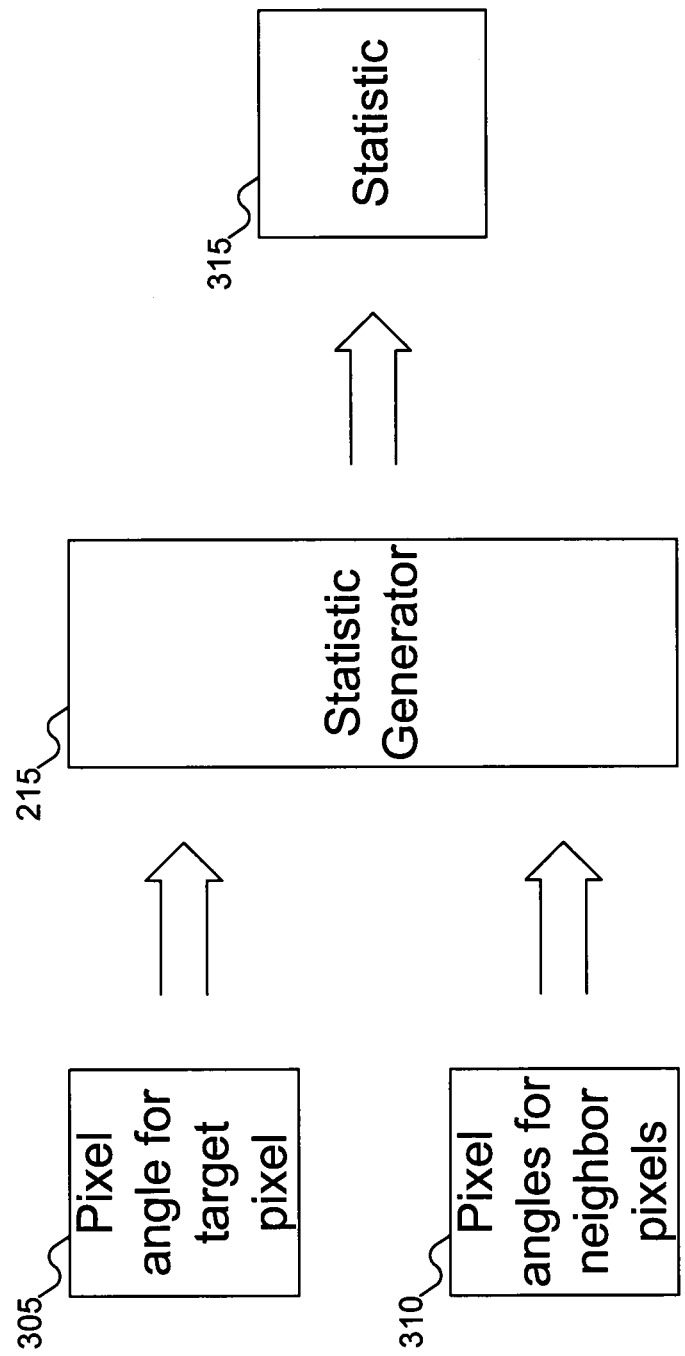
FIG. 3 shows the statistic generator of FIG. 2 being used to detect artifacts in a first embodiment of the invention.

FIG. 3 shows the statistic generator of FIG. 2 being used to detect artifacts in a first embodiment of the invention. In FIG. 3, receiver 210 (not shown in FIG. 3) receives the value for the target pixel (value 305) and the values for neighbor pixels of the target pixel (values 310). It should be understood that the term "neighbor" is not intended to be limited to immediately adjacent pixels, but rather includes pixels that might be more distant from the target pixel. Thus, a pixel that is separated from the target pixel by one, two, three, or more pixels might still be considered a "neighbor" of the target pixel. In addition, it should be understood that even though a "neighbor" pixel's value is used in detecting artifacts does not automatically mean that the values of all pixels separating the target pixel and the "neighbor" pixel are used in detecting artifacts. Further, the analysis of the target pixel for artifacts does not necessarily require analyzing neighbor pixels in all directions: for example, the neighbor pixels used might be all located on one side of the target pixel in the same row as the target pixel. Nevertheless, in some embodiments, pixels that are within a certain "radius" of the target pixel can be considered as "neighbors".

A person skilled in the art will recognize that the term "value" can mean any desired "value" of the pixels. For example, the "value" can be the luma, or brightness, of the pixels (target and neighbors). Or, the "value" can be the chroma, or color, of the pixels. A person skilled in the art will recognize other "values" can be also used in the analysis of the target pixel for artifacts.

Statistic generator 215 uses the values of the target pixel and its neighbors to determine statistics for the target pixel. The desired behavior of the target pixel value is that it is does not differ too greatly from its neighbors. For example, if the "value" of the pixel is the angle used to interpolate the pixel's value, the angle of interpolation for the target pixel should be relatively close to the angles used for the neighbor pixels. If the angle of interpolation for the target pixel differs too greatly from the angles used for the neighboring pixels, then it is possible that the pixel exhibits an artifact. Eq. (1) shows an equation that can be used in this situation to test for a pixel artifact:

$$\delta((|EA[nCol] - EA[nCol - i]|) > ThrAngDist) \&\&$$
$$\sum_i ((EA[nCol] > 4 \&\& EA[nCol - i] < 4)||$$
$$(EA[nCol] < 4 \&\& EA(ncol - i] > 4))) \quad \text{Eq. (1)}$$

The result of this equation can then be used as statistic 315.

In Eq. (1), EA identifies an index of the angle of interpolation; Table 1 shows the correlation between the angle of interpolation and the corresponding EA value:

TABLE 1

| Angle | EA value |
|---|---|
| −76° | 0 |
| −72° | 1 |
| −63° | 2 |
| −45° | 3 |
| 0° | 4 |
| 45° | 5 |
| 63° | 6 |
| 72° | 7 |
| 76° | 8 |

The other variables in Eq. (1) are as follows: ThrAngDist is a threshold value, which can be set as desired. nCol is the column index of the target pixel. δ is a function that returns 1 if its parameter is evaluates to Boolean TRUE, and returns 0 otherwise. Finally, i defines the pixels in the neighborhood: the size of the neighborhood can be set as desired. In one embodiment, the size of the neighborhood is defined as |EA−4|+AdjWinSize, where EA is the EA value of the target pixel, and AdjWinSize is a constant. Thus, it can be seen that in this described embodiment, the size of the neighborhood varies with the angle of interpolation used for the target pixel. But a person skilled in the art will recognize that other variants on this statistic generation can be used, either in terms of the statistic formula itself, or in terms of the size of the window (or both).

It might be noticed that because Eq. (1) always subtracts i from nCol, the neighbor pixels of the target pixel are always to the left of the target pixel. If nCol−i were replaced with nCol+i, the variant equation involves the neighbors on the right side of the target pixel. This equation is shown as Eq. (1').

$$\delta((|EA[nCol] - EA[nCol - i]|) > ThrAngDist) \&\&$$
$$\sum_i ((EA[nCol] > 4 \&\& EA[nCol - i] < 4)||$$
$$(EA[nCol] < 4 \&\& EA(ncol - i] > 4))) \quad \text{Eq. (1')}$$

Figure 4:
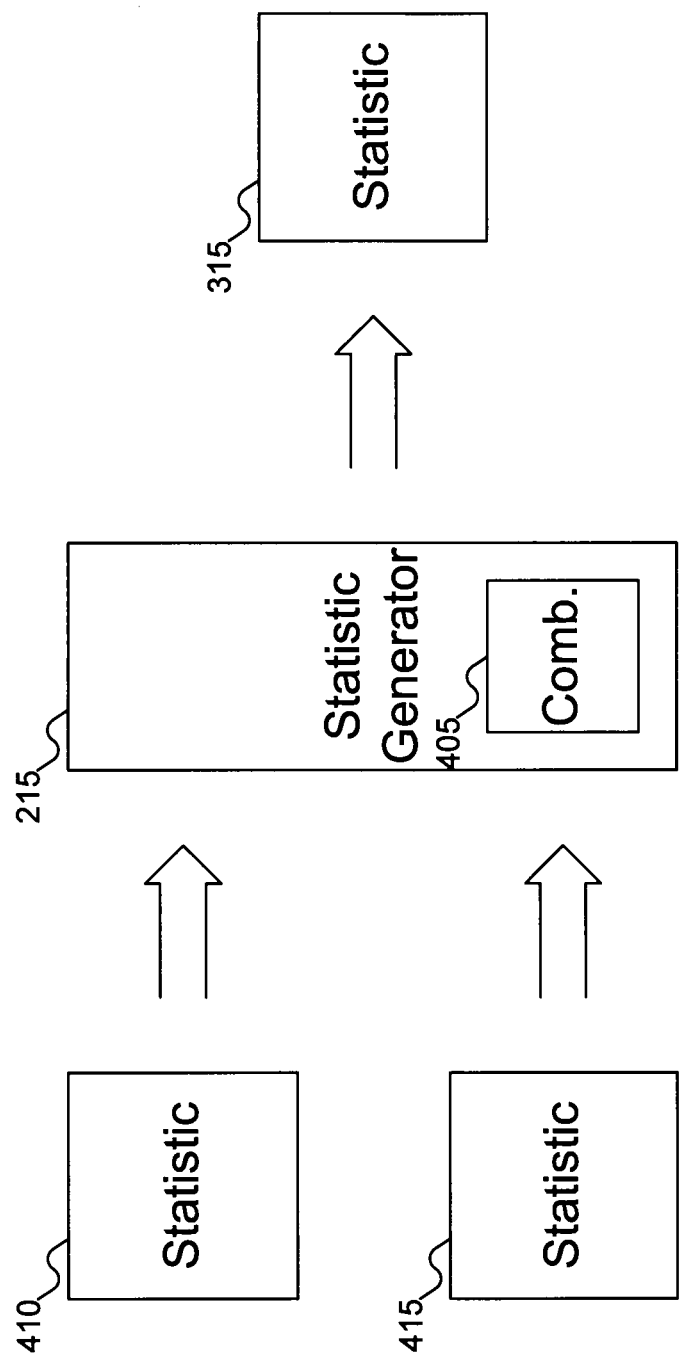
FIG. 4 shows the statistic generator of FIG. 2 being used to detect artifacts in a second embodiment of the invention.

FIG. 4 shows the statistic generator of FIG. 2 being used to detect artifacts in a second embodiment of the invention. In FIG. 4, combiner 405 can be used to combine the results of two different statistics 410 and 415 to produce statistic 315. For example, Eq. (1) above produces a statistic involving neighbors on the left of the target pixel, and Eq. (1') above produces a statistic involving neighbors on the right of the target pixel. Combiner 405 can be used to combine these two statistics into a single statistic: for example, by adding the two statistics together. A person skilled in the art will recognize other ways to combine multiple statistics, and also that statistics generator 215 can produce a single statistic without using combiner 405 (for example, by using neighbors on both sides of the target pixel).

Figure 5:
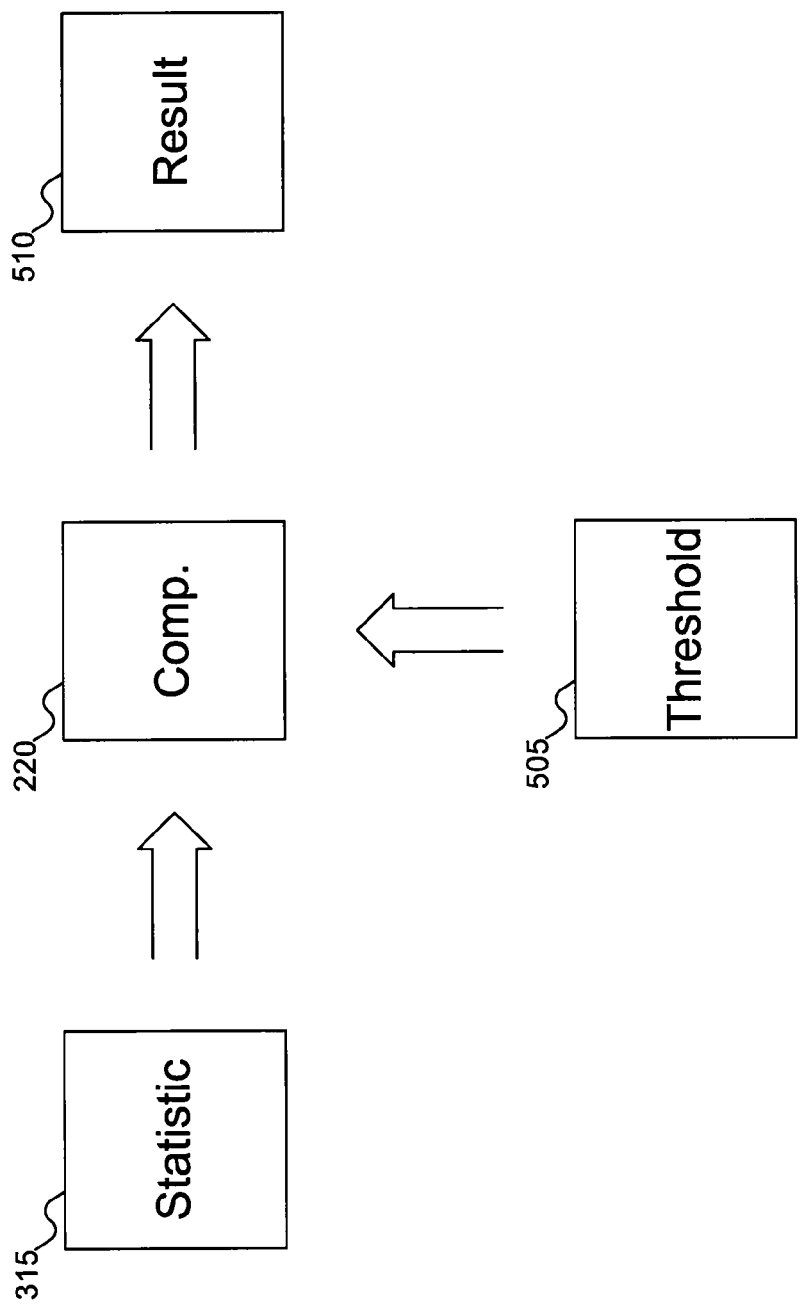
FIG. 5 shows the comparator of FIG. 2 being used to detect artifacts.

FIG. 5 shows the comparator of FIG. 2 being used to detect artifacts. In FIG. 5, comparator 220 compares statistic 315 with a threshold 505. The result of this comparison is shown as result 510, and indicates whether an artifact is detected for the pixel.

While FIG. 5 shows comparator 220 comparing only a single statistic with a single threshold, a person skilled in the art will recognize that comparator 220 can compare any number of statistics with any number of thresholds (the same or different), and combine the results of this comparison in some way to produce a final result. For example, comparator 220 might compare a statistic using the left neighbors of the target pixel with a threshold, and also compare a statistic using the right neighbors of the target pixel with a threshold. Further, comparator 220 might also compare the sum of these two statistics against another threshold. If any of these comparisons show that the statistics exceed the pertinent thresholds, then comparator 220 can return the result indicating an artifact. A person skilled in the art will recognize other ways in which statistics can be compared with thresholds to produce results.

Figure 6:
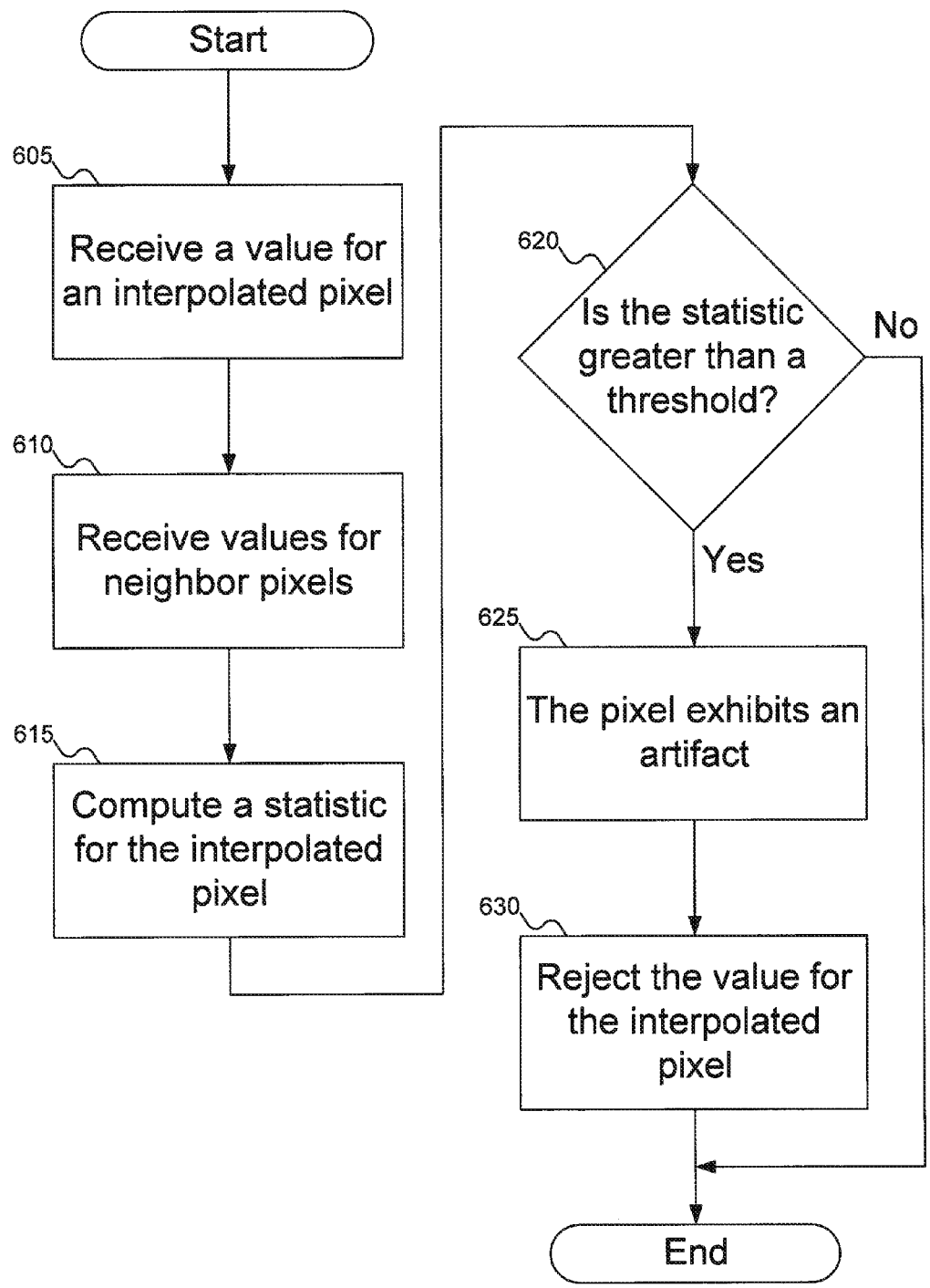
FIG. 6 shows a flowchart of the procedure for the display of FIG. 2 to detect artifacts.

FIG. 6 shows a flowchart of the procedure for the display of FIG. 2 to detect artifacts. In FIG. 6, at step 605, the display receives a value for an interpolated pixel. At step 610, the display receives values for pixels that are neighbors of the target pixel. As discussed above, neighbors are not limited to pixels immediately adjacent to the target pixel, and can include pixels within any desired radius from the target pixel. At step 615, the display computes a statistic for the target pixel. At step 620, the display determines whether the statistic is greater than a predetermined threshold. If the statistic is greater than the threshold, then at step 625 the pixel is determined to exhibit an artifact, and at step 630 the pixel value for the interpolated pixel is rejected.

Figure 7:
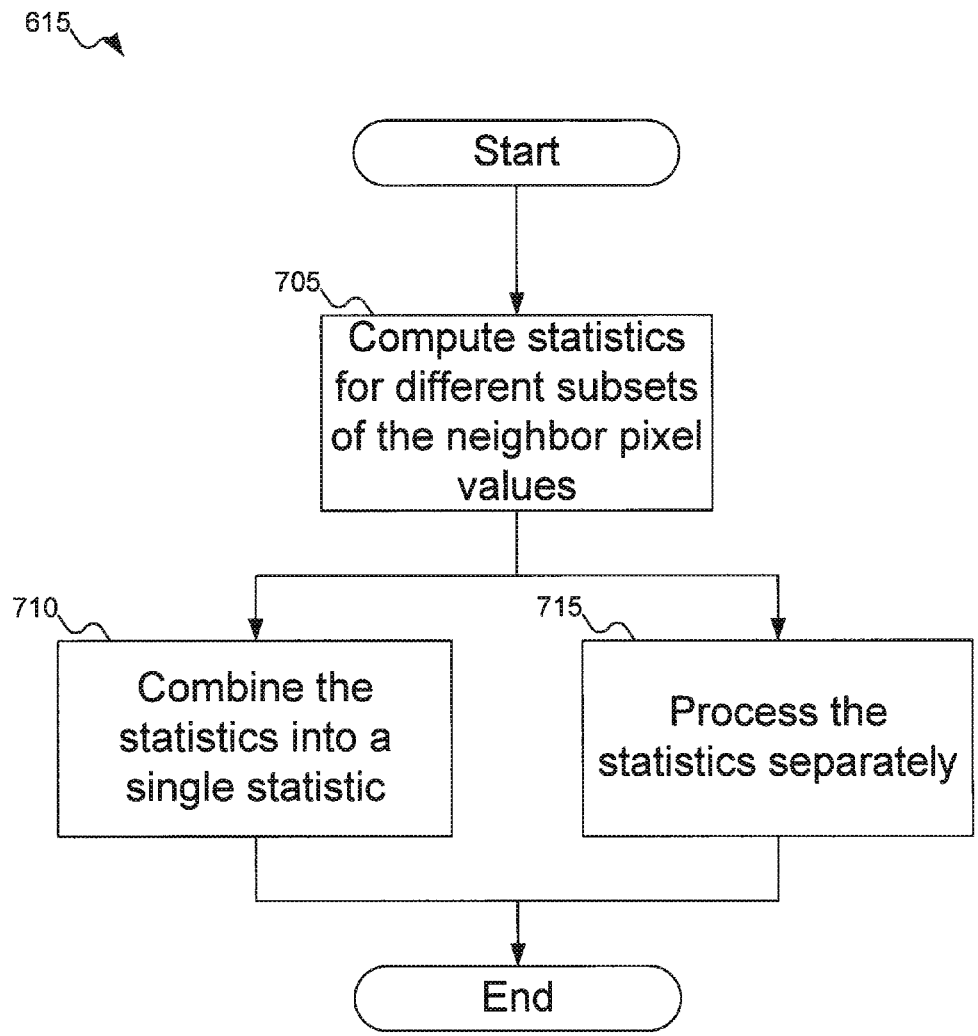
FIG. 7 shows a flowchart of the procedure for the statistic generator of FIG. 2 to generate statistics for use in detecting artifacts.

As discussed above with reference to FIGS. 3-5, the statistic generator can generate multiple statistics for the target pixel, depending on the desired implementation. But step 615 of FIG. 6 describes computing only a single statistic. FIG. 7 shows how step 615 can be modified to support multiple statistics. At step 705, given the available pixel values (of the target pixel and the neighboring pixels), different subsets of the available pixel values can be used to generate multiple statistics. Then, at step 710, the different statistics can be combined into a single statistic. For example, as discussed above with reference to FIG. 4, different statistics can be added together. Alternatively, at step 715, the different statistics can be processed separately: namely, each statistic can be compared with an appropriate threshold in step 620 (these multiple thresholds can be the same or different, as appropriate).

A person skilled in the art will recognize that some embodiments of the invention might generate multiple statistics, test the value of the target pixel using the individual statistics, and also combine the statistics and test the combination. In these embodiments, steps 710 and 715 can both be performed. (A person skilled in the art will also recognize that the combined statistic can be considered a separate statistic generated in step 705, allowing steps 710 and 715 to be considered true alternatives (only one branch followed).

Figure 8:
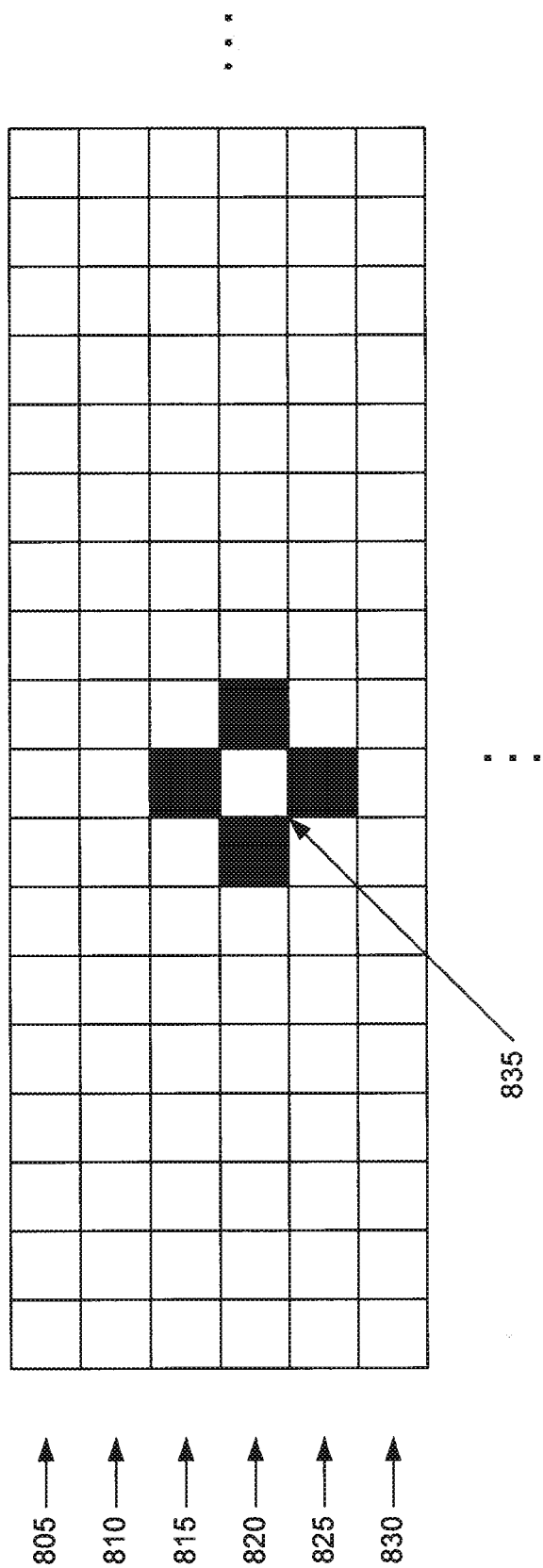
FIG. 8 shows an image with a pixel exhibiting pixel sparkling.

One particular variety of artifact is called pixel sparkling. Pixel sparkling occurs when one pixel differs from each of its immediately adjacent neighbors in the same way. For example, if brightness is the characteristic being considered, a pixel can be said to be sparkling if it is brighter than all of its adjacent neighbors, or is darker than all of its adjacent neighbors. FIG. 8 illustrates this situation. In FIG. 8, rows 805, 810, 815, 820, 825, and 830 of an image are shown. Pixel 835 is a light pixel, whereas its four adjacent neighbors—left, right, above, and below—are dark. As with artifacts in general, pixel sparkling in a still image is not likely to catch the eye. But where the image is a single frame in a moving image, pixel value that stands out like this, flashing on the screen even for a single frame, would draw the eye to it unintentionally.

While the discussion above and below focuses on pixels sparkling somewhere in the interior of an image, a person skilled in the art will recognize that pixels on the edge of the image might only have three neighbors, and a pixel in the corner might only have two neighbors. A person skilled in the art will recognize how to adapt embodiments of the invention for these special cases.

Figure 9:
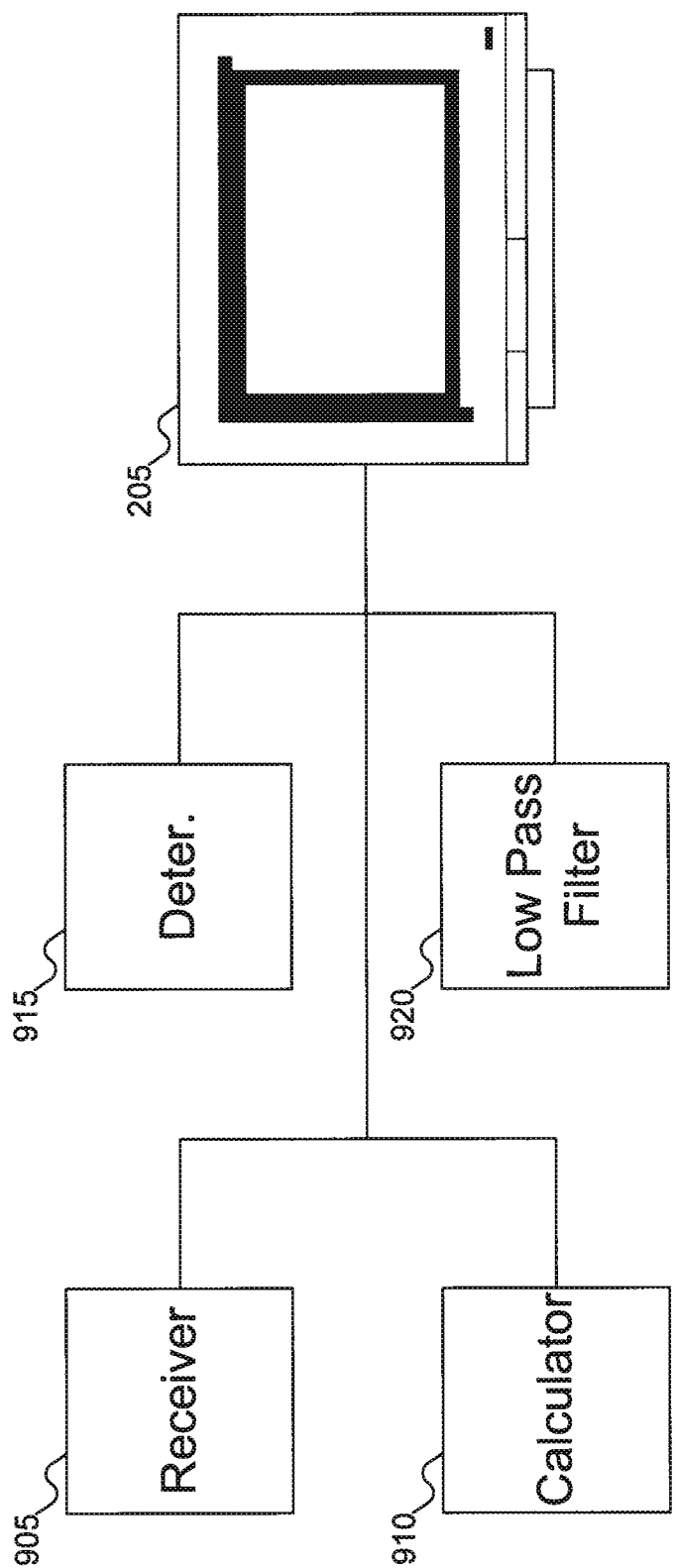
FIG. 9 shows a display operative to detect pixel sparkling in interpolated data, according to another embodiment of the invention.

FIG. 9 shows a display operative to detect pixel sparkling in interpolated data, according to another embodiment of the invention. In FIG. 9, display 205 includes receiver 905, calculator 910, determiner 915, and low pass filter 920. Receiver 905 is responsible for receiving the values for the pixels in question. As with receiver 210 discussed above with reference to FIG. 2, receiver 905 might be receiving the values from either within or without display 205. (A person skilled in the art will also recognize that if the embodiments of FIGS. 2 and 9 are combined, receiver 905 and receiver 210 might be the same receiving unit.)

Calculator 910 is responsible for calculating deltas, or differences, between the values for the target pixel and its four adjacent neighbors. As discussed above with reference to FIG. 3, the values might be luma, chroma, or any other desired value for the pixels. Provided the arithmetic is performed consistently, any desired calculation model can be used to calculate the deltas.

Determiner 915 is responsible for determining whether a pixel exhibits pixel sparkling. As suggested above, this can be determined by comparing the various deltas calculated by calculator 910: if the deltas all exhibit the same sign (positive or negative), then the pixel exhibits pixel sparkling.

Finally, low pass filter 920 can be used to adjust the value for the target pixel, if determiner 915 indicates that the target pixel exhibits sparkling. Low pass filter 920 can be any desired filter. Known filters that can be used include a five tap horizontal low pass filter, a three tap horizontal low pass filter, and a two dimensional filter. A person skilled in the art will recognize other varieties of filters that can be used (and will recognize that the filter used does not need to be a "low pass" filter: any adjuster that can adjust the value of the pixel to address pixel sparkling can be applied).

Figure 10:
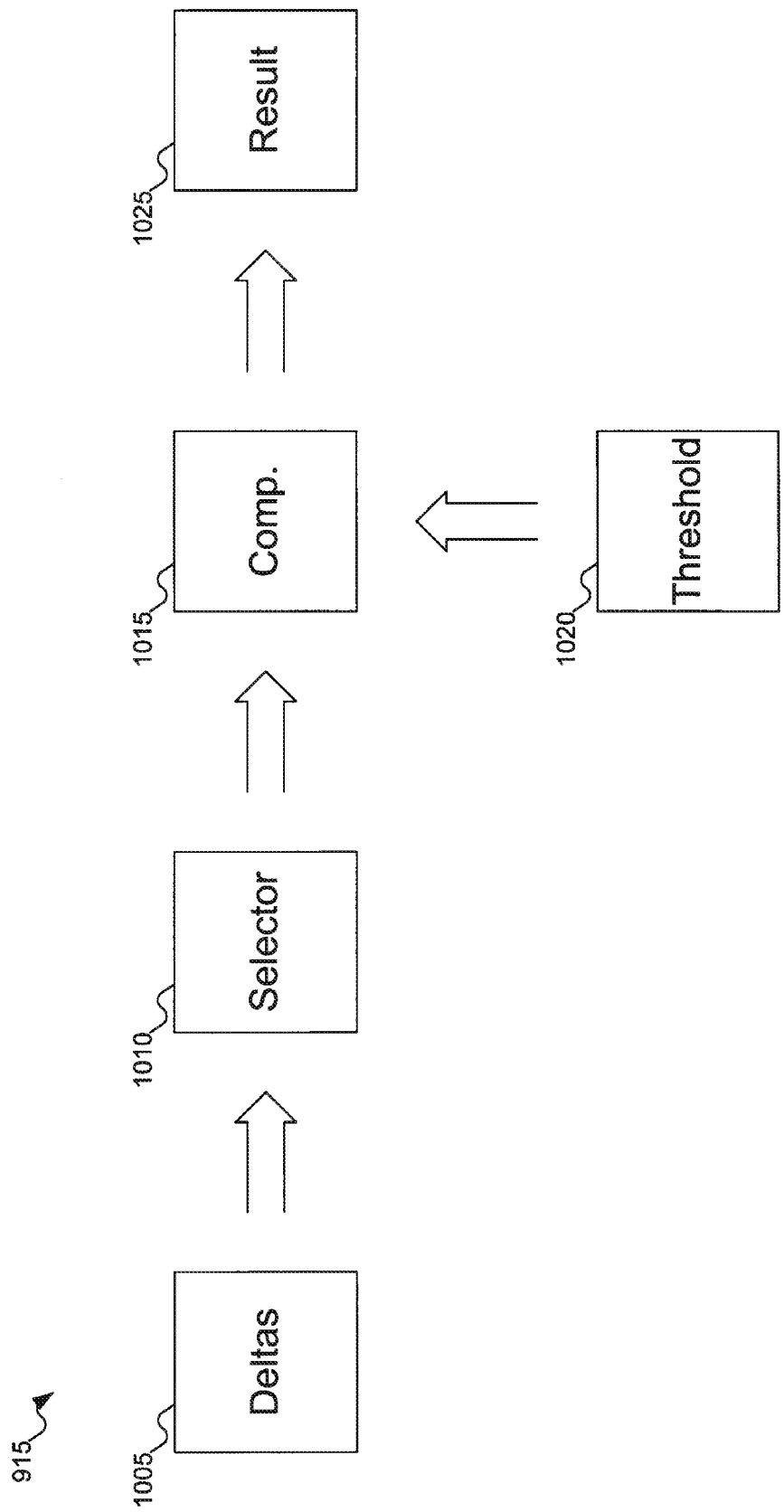
FIG. 10 shows a block diagram of how the display of FIG. 9 can be used to detect pixel sparkling in a first embodiment of the invention.

While it is true that any pixel whose value differs from all of its neighbors in the same direction can be said to "sparkle", this does not mean the every pixel that "sparkles" necessarily needs to be adjusted. For example, if the variation between the target pixel and its neighbors is minimal enough, the fact that the pixel sparkles might not be enough to make the pixel be an attractant to the eye. FIG. 10 shows a block diagram of how the display of FIG. 9 can be used to detect pixel sparkling in a first embodiment of the invention. In FIG. 10, deltas 1005 (computed by calculator 910 of FIG. 9) are passed to selector 1010. Selector 1010 can then select a value to be used in determining whether deltas 1005 are sufficient to consider the pixel sparkling a problem. In one embodiment, selector 1010 selects the minimum value of the absolute values of deltas 1005. But a person skilled in the art will recognize that selector 1010 can select any value to use. Further, a person skilled in the art will recognize that the value in question does not actually have to be "selected" from deltas 1005: the "selected" value can, in fact, be computed in some one (e.g., by computing the statistical mean of deltas 1005). This selected value can then be passed to comparator 1015. Comparator 1015 compares the selected value with threshold 1020. If the selected value is exceeds threshold 1020, then result 1025 can indicate that the pixel exhibits pixel sparkling.

A person skilled in the art will recognize that comparator 1015 can operate by comparing the selected value with threshold 1020 in any desired way. In one embodiment, result 1025 might indicate pixel sparkling if the selected value is greater than threshold 1020. In another embodiment, result 1025 might indicate pixel sparkling if the selected value is less than threshold 1020.

Figure 11:
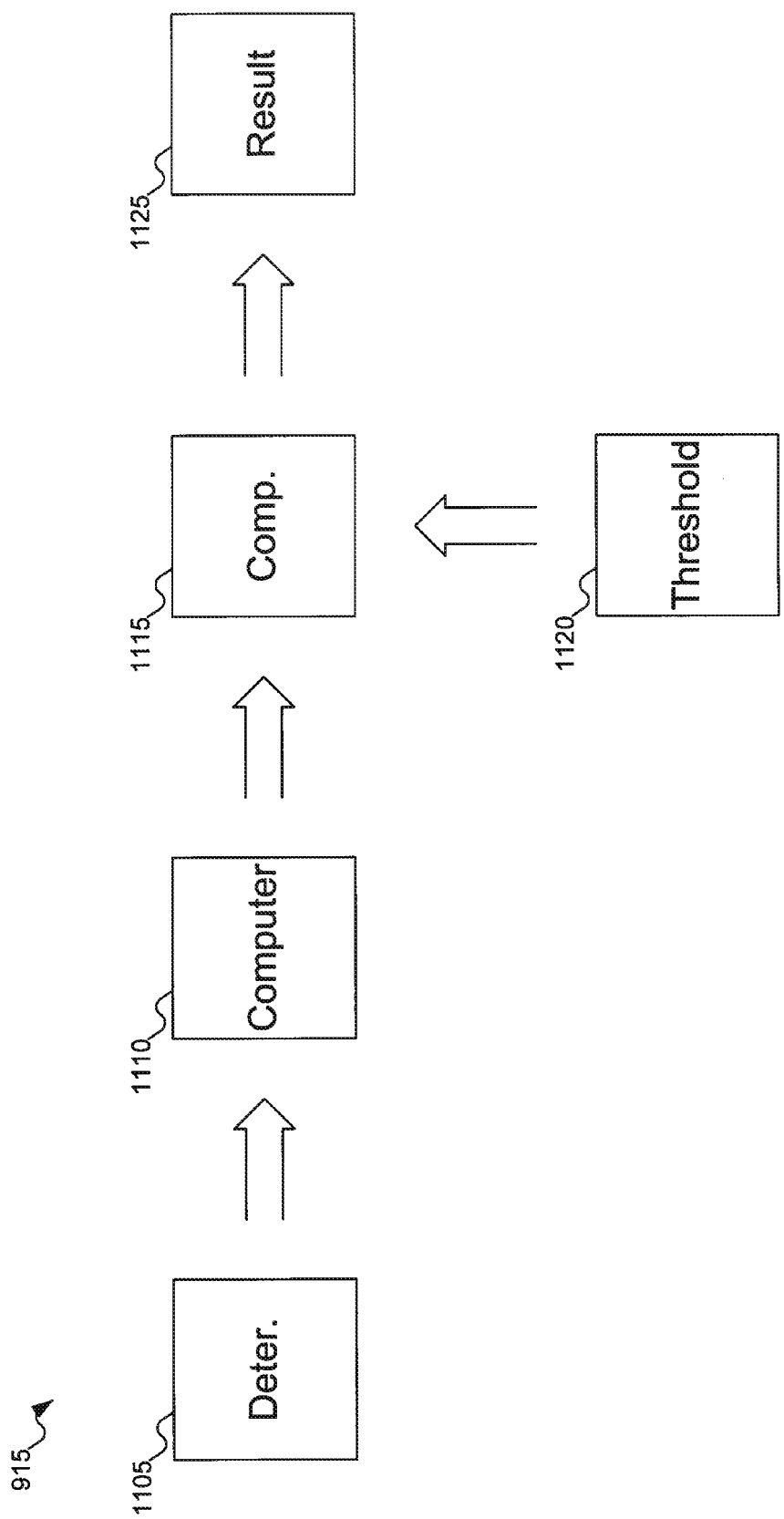
FIG. 11 shows a block diagram of how the display of FIG. 9 can be used to detect pixel sparkling in a second embodiment of the invention.

In addition to using the deltas between the target pixel and its adjacent neighbors, other factors can be used to determine if a pixel exhibits pixel sparkling. One such additional factor examines an edge angle for the pixel. FIG. 11 shows a block diagram of how the display of FIG. 9 can be used to detect pixel sparkling in a second embodiment of the invention.

To determine the edge angle for a target pixel, determiner 1105 computes the deltas between the edge angles of the target pixel and each of its left and right adjacent neighbors. As discussed above with reference to FIG. 3 and shown in Table 1, determiner 1105 does not need to use the actual angles of the pixels, but can instead compute deltas using the indices representing the edge angles. If these deltas are both positive or both negative (indicating that the edge angle for the target pixel differs from both of its left and right adjacent neighbors in the direction), then determiner 1105 can determine the edge angle to be the minimum of the absolute values of the deltas so computed. But a person skilled in the art will recognize that this calculation of the edge angle is but one embodiment, and other embodiments can determine edge angles in different ways.

Once the edge angle is determined (or, in the above-described embodiment, the delta between the indices of the edge angle is determined), a value can be computed from this value by computer 1110, relative to a vertical angle. A "vertical angle" refers to a line that runs from top to bottom. In terms of the indices of Table 1, a vertical angle has an index of 4. In one embodiment, computer 1110 computes the absolute value of the difference between the determined edge angle and 4 (the index representing the vertical angle); but a person skilled in the art will recognize that computer 1110 can compute values using other formulae.

Given the value from computer 1110, comparator 1115 can compare this value with threshold 1120 to determine whether the edge angle suggests the pixel exhibits pixel sparkling; this result is shown as result 1125. Threshold 1120, as will all of the other thresholds discussed in this document, can be the same or different as desired.

Figure 12:
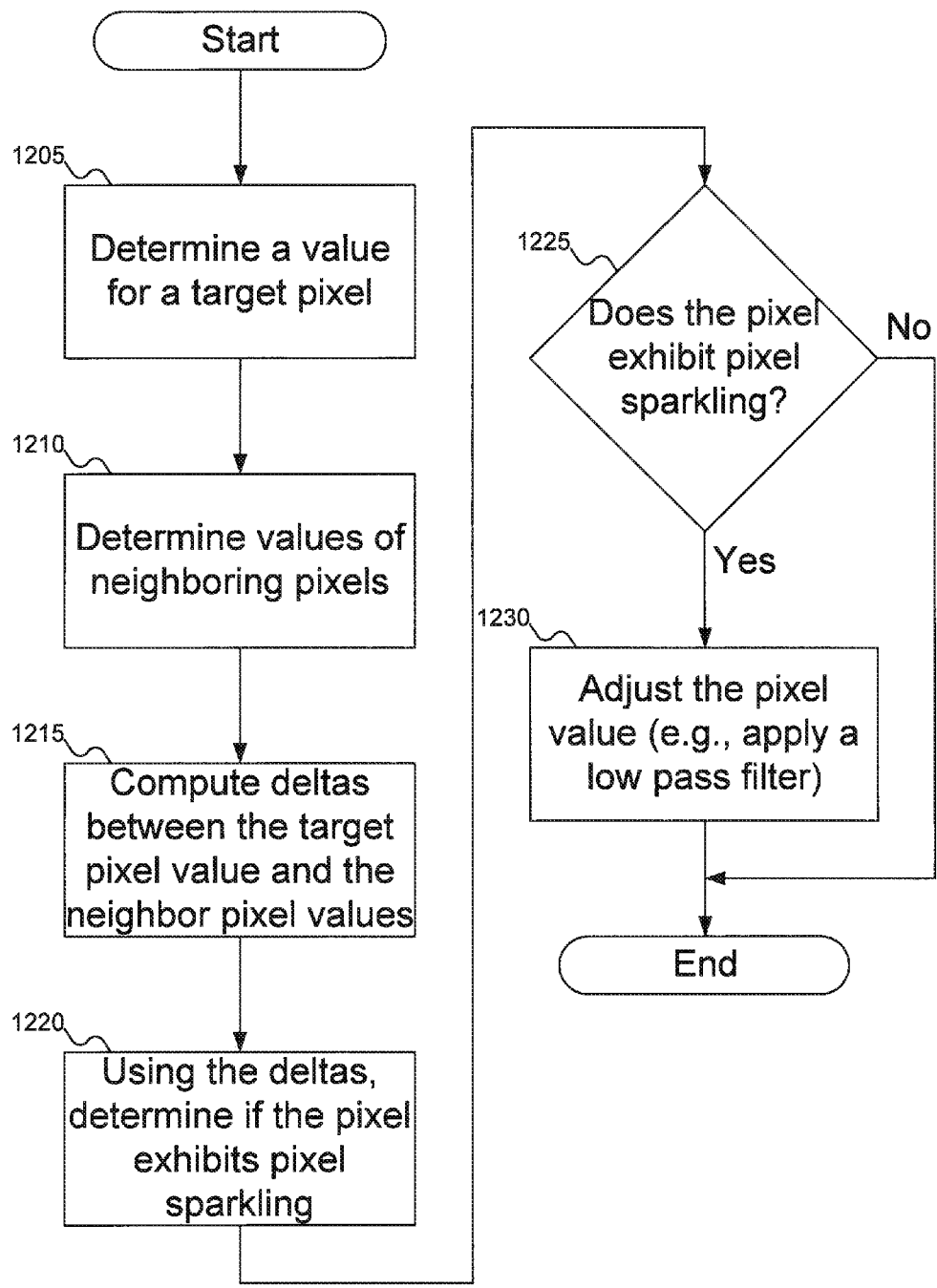
FIG. 12 shows a flowchart of the procedure for the display of FIG. 9 to detect pixel sparkling.

FIG. 12 shows a flowchart of the procedure for the display of FIG. 9 to detect pixel sparkling. In FIG. 12, at step 1205, the display determines a value for a target pixel. At step 1210, the display determines values for the neighboring pixels. At step 1215, the display calculates deltas between the value for the target pixel and for the neighboring pixels. At step 1220, the display uses these deltas to determine if the pixel exhibits pixel sparkling. If at step 1225 the pixel exhibits pixel sparkling, then at step 1230 the value for the target pixel can be adjusted (e.g., by applying a low pass filter) to address the pixel sparkling.

Figure 13:
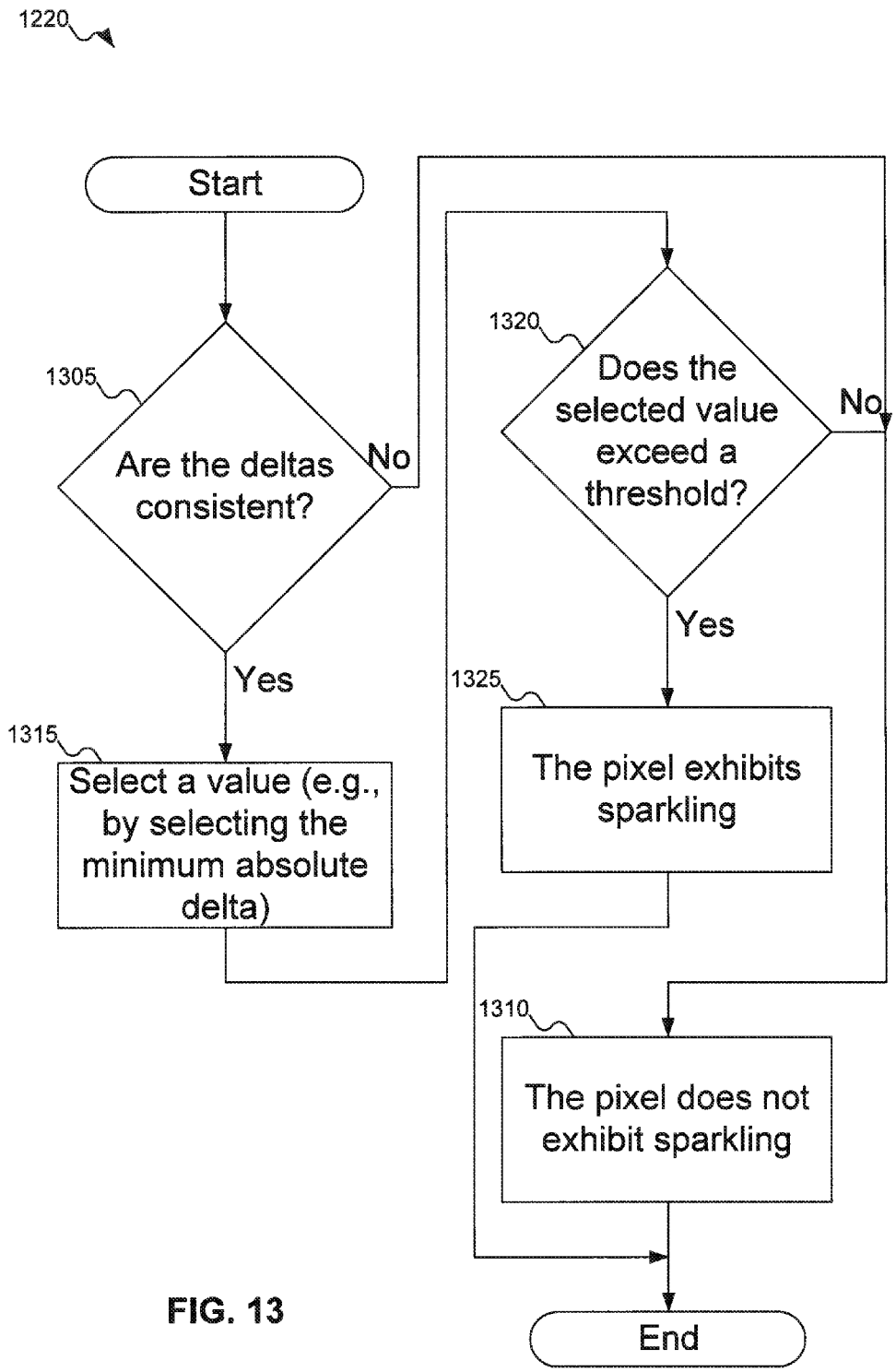
FIG. 13 shows more detail about how the display of FIG. 9 can detect pixel sparkling.

FIG. 13 shows more detail about how the display of FIG. 9 can detect pixel sparkling, with reference to step 1220 of FIG. 12. At step 1305, the display checks to see if the deltas are all consistent (that is, all are positive or negative). If the deltas are not consistent, then processing proceeds to step 1310, to indicate that the target pixel does not exhibit pixel sparkling. Otherwise, at step 1315, the display selects a value. As discussed above, in one embodiment the selected value is the minimum of the absolute values of the deltas. At step 1320, the selected value is compared with a threshold. If the selected value exceeds a threshold, then at step 1325 the pixel exhibits sparkling. Otherwise, at step 1310, the pixel does not exhibit sparkling.

Figure 14:
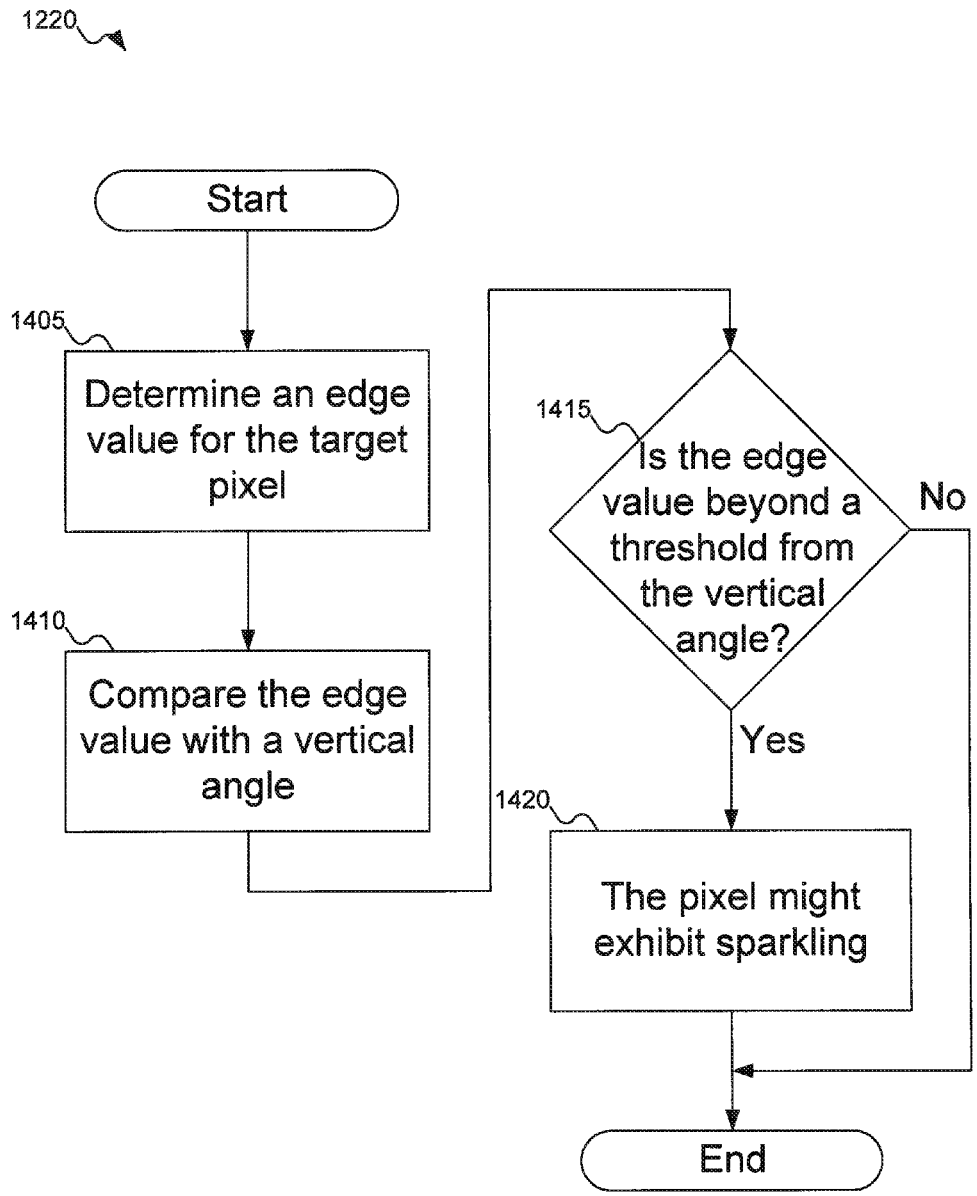
FIG. 14 shows a flowchart of the procedure for the display of FIG. 9 to use edge angles to detect pixel sparkling.

FIG. 14 shows a flowchart of the procedure for the display of FIG. 9 to use edge angles to detect pixel sparkling, as can be used in step 1220 of FIG. 12. In FIG. 14, at step 1405, an edge value for the target pixel is determined. As discussed above, this edge value can be computed as the minimum of the absolute value of the differences between the edge angle of the target pixel and its left and right adjacent neighbors, provided the differences are consistent in sign (i.e., both positive or both negative). At step 1410, this edge value is compared with a vertical angle. At step 1415, the display determines whether the edge value is too far from the vertical angle, using any desired definition for "too far". If, at step 1415, the display determines that the edge value is too far from the vertical angle, then at step 1420 the pixel might exhibit pixel sparkling. The term "might" is used because in one embodiment according to FIG. 14, the edge angle analysis is combined with the pixel value analysis of FIG. 12, and both analyses would then need to indicate pixel sparkling before the filter could be applied. But a person skilled in the art will recognize other embodiments can be used, where the pixel is determined to exhibit pixel sparkling if either analysis indicates the possibility.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Such embodiments may also be referred to as program products. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may also be used in conjunction with communications media such antennas, wires, optical fibers, microwaves, radio waves, and other electromagnetic or optical carriers. Associated data may be delivered over transmission environments, including physical and/or logical networks, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "illustrated embodiment" or the like are used herein, these phrases are meant to generally reference embodiment possibilities, and are not intended to limit the invention to particular embodiment configurations. As used herein, these terms may reference the same or different embodiments that are combinable into other embodiments. Further, the various embodiments may be combined in any manner desired, to produce combinations not specifically discussed herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus comprising:
   a receiver to receive a value for a pixel and a plurality of values for a plurality of second pixels, said plurality of second pixels being adjacent to said pixel, wherein said value represents a characteristic of said pixel and said plurality of values represent the characteristic of each of said plurality of second pixels;
   a calculator to calculate a plurality of deltas between said value and said plurality of values; and
   a determiner to determine whether said pixel exhibits pixel sparkling based on said plurality of deltas,
   where said pixel is an interpolated pixel.

2. An apparatus according to claim 1, further comprising an adjuster to adjust said value for said pixel if said pixel exhibits pixel sparkling.

3. An apparatus according to claim 2, wherein said value for said pixel is not adjusted if said pixel does not exhibit pixel sparkling.

4. A method according to claim 2, wherein the adjuster includes a low pass filter to apply to said pixel.

5. A method according to claim 4, wherein the low pass filter includes a five tap horizontal low pass filter to apply to said pixel.

6. A method according to claim 4, wherein the low pass filter includes a three tap horizontal low pass filter to apply to said pixel.

7. A method according to claim 4, wherein the low pass filter includes a two dimensional low pass filter to apply to said pixel.

8. An apparatus according to claim 1, wherein the receiver is operative to receive a brightness for said pixel and a plurality of brightnesses for said plurality of second pixels.

9. An apparatus according to claim 1, wherein the receiver is operative to receive a color for said pixel and a plurality of colors for said plurality of second pixels.

10. An apparatus according to claim 1, wherein the receiver is operative to receive an angle for said pixel and a plurality of angles for said plurality of second pixels.

11. An apparatus according to claim 1, wherein the determiner includes:
    a second determiner to determine if said plurality of deltas are consistent;
    a selector to select a minimum of said plurality of deltas; and
    a comparator to compare said selected minimum with a threshold to determine if said pixel exhibits pixel sparkling.

12. An apparatus according to claim 11, wherein:
    the determiner further includes:
      a third determiner to determine an edge angle for said pixel; and
      a second computer to compute a variation between said edge angle and a vertical angle; and
    the comparator is operative to compare said selected minimum with said threshold and said variation with a second threshold to determine if said pixel exhibits pixel sparkling.

13. A method for detecting pixel sparkling, comprising:
    determining a value for a pixel, wherein the value represents a characteristic of the pixel;
    determining a plurality of values for a plurality of adjacent pixels, wherein the plurality of values represent the characteristic of each of the plurality of second pixels;
    computing a plurality of deltas between the value for the pixel and the plurality of values;
    determining whether the pixel exhibits pixel sparkling from the plurality of deltas; and if the pixel exhibits pixel sparkling, adjusting the value for the pixel,
wherein the pixel is an interpolated pixel.

14. A method according to claim 13, further comprising, if the pixel does not exhibit pixel sparkling, not adjusting the value for the pixel.

15. A method according to claim 13, wherein:
determining a value for a pixel includes determining a brightness for the pixel; and
determining a plurality of values for a plurality of adjacent pixels includes determining a plurality of brightnesses for the plurality of adjacent pixels.

16. A method according to claim 13, wherein:
determining a value for a pixel includes determining a color for the pixel; and
determining a plurality of values for a plurality of adjacent pixels includes determining a plurality of colors for the plurality of adjacent pixels.

17. A method according to claim 13, wherein:
determining a value for a pixel includes determining an angle for the pixel; and
determining a plurality of values for a plurality of adjacent pixels includes determining a plurality of angles for the plurality of adjacent pixels.

18. A method according to claim 17, wherein determining a plurality of angles for the plurality of adjacent pixels includes:
determining a first angle for a first adjacent pixel; and
determining a second angle for a second adjacent pixel.

19. A method according to claim 13, wherein determining whether the pixel exhibits pixel sparkling from the plurality of deltas includes:
determining if the plurality of deltas are consistent;
selecting a minimum of the plurality of deltas; and
comparing the selected minimum with a threshold to see if the pixel exhibits pixel sparkling.

20. A method according to claim 13, wherein:
determining whether the pixel exhibits pixel sparkling from the plurality of deltas further includes:
determining an edge angle for the pixel; and
computing a variation between the edge angle and a vertical angle; and
comparing the selected minimum with a threshold to see if the pixel exhibits pixel sparkling includes comparing the selected minimum with the threshold and the variation with a second threshold to see if the pixel exhibits pixel sparkling.

21. A method according to claim 13, wherein adjusting the value for the pixel includes applying a low pass filter to the pixel.

22. A method according to claim 21, wherein applying a low pass filter to the pixel includes applying a five tap horizontal low pass filter to the pixel.

23. A method according to claim 21, wherein applying a low pass filter to the pixel includes applying a three tap horizontal low pass filter to the pixel.

24. A method according to claim 21, wherein applying a low pass filter to the pixel includes applying a two dimensional low pass filter to the pixel.

25. An article comprising a non-transitory machine-accessible medium having associated data that, when accessed, results in a machine:
determining a value for a pixel, wherein the value represents a characteristic of the pixel;
determining a plurality of values for a plurality of adjacent pixels, wherein the plurality of values represent the characteristic of each of the plurality of second pixels;
computing a plurality of deltas between the value for the pixel and the plurality of values;
determining whether the pixel exhibits pixel sparkling from the plurality of deltas; and
if the pixel exhibits pixel sparkling, adjusting the value for the pixel,
wherein the pixel is an interpolated pixel.

26. An article according to claim 25, wherein the non-transitory machine-accessible medium has further associated data that, when accessed, results in the machine not adjusting the value for the pixel if the pixel does not exhibit pixel sparkling.

27. An article according to claim 25, wherein:
determining a value for a pixel includes determining a brightness for the pixel; and
determining a plurality of values for a plurality of adjacent pixels includes determining a plurality of brightnesses for the plurality of adjacent pixels.

28. An article according to claim 25, wherein:
determining a value for a pixel includes determining a color for the pixel; and
determining a plurality of values for a plurality of adjacent pixels includes determining a plurality of colors for the plurality of adjacent pixels.

29. An article according to claim 25, wherein:
determining a value for a pixel includes determining an angle for the pixel; and
determining a plurality of values for a plurality of adjacent pixels includes determining a plurality of angles for the plurality of adjacent pixels.

30. An article according to claim 29, wherein determining a plurality of angles for the plurality of adjacent pixels includes:
determining a first angle for a first adjacent pixel; and
determining a second angle for a second adjacent pixel.

31. An article according to claim 25, wherein determining whether the pixel exhibits pixel sparkling from the plurality of deltas includes:
determining if the plurality of deltas are consistent;
selecting a minimum of the plurality of deltas; and
comparing the selected minimum with a threshold to see if the pixel exhibits pixel sparkling.

32. An article according to claim 25, wherein:
determining whether the pixel exhibits pixel sparkling from the plurality of deltas further includes:
determining an edge angle for the pixel; and
computing a variation between the edge angle and a vertical angle; and
comparing the selected minimum with a threshold to see if the pixel exhibits pixel sparkling includes comparing the selected minimum with the threshold and the variation with a second threshold to see if the pixel exhibits pixel sparkling.

33. An article according to claim 25, wherein adjusting the value for the pixel includes applying a low pass filter to the pixel.

34. An article according to claim 33, wherein applying a low pass filter to the pixel includes applying a five tap horizontal low pass filter to the pixel.

35. An article according to claim 33, wherein applying a low pass filter to the pixel includes applying a three tap horizontal low pass filter to the pixel.

36. An article according to claim 33, wherein applying a low pass filter to the pixel includes applying a two dimensional low pass filter to the pixel.

* * * * *

UNITED STATES PATENT AND TRADEMARK OFFICE
CERTIFICATE OF CORRECTION

PATENT NO. : 8,437,580 B2
APPLICATION NO. : 12/943819
DATED : May 7, 2013
INVENTOR(S) : Yue Ma and Hongmin Zhang Page 1 of 1

It is certified that error appears in the above-identified patent and that said Letters Patent is hereby corrected as shown below:

In the Claims:

On column 10, lines 19, 21, 24, and 27, the words "A method" should read --An apparatus--.

Signed and Sealed this
First Day of October, 2013

Teresa Stanek Rea
*Deputy Director of the United States Patent and Trademark Office*